United States Patent
Pan et al.

(10) Patent No.: US 11,603,423 B2
(45) Date of Patent: Mar. 14, 2023

(54) ACRYLONITRILE COPOLYMER BINDER AND APPLICATION THEREOF IN LITHIUM ION BATTERIES

(71) Applicant: SICHUAN INDIGO TECHNOLOGY CO., LTD., Sichuan (CN)

(72) Inventors: Zhonglai Pan, Chengdu (CN);
Xiaozheng Zhang, Chengdu (CN);
Chuan Lyu, Chengdu (CN);
Hongchang Du, Chengdu (CN)

(73) Assignee: SICHUAN INDIGO TECHNOLOGY CO., LTD., Chengdu (CN)

(*) Notice: Subject to any disclaimer, the term of this patent is extended or adjusted under 35 U.S.C. 154(b) by 718 days.

(21) Appl. No.: 16/326,597

(22) PCT Filed: Dec. 9, 2016

(86) PCT No.: PCT/CN2016/109197
§ 371 (c)(1),
(2) Date: Feb. 19, 2019

(87) PCT Pub. No.: WO2018/032665
PCT Pub. Date: Feb. 22, 2018

(65) Prior Publication Data
US 2021/0189037 A1  Jun. 24, 2021

(30) Foreign Application Priority Data
Aug. 17, 2016 (CN) .......................... 201610677774.7

(51) Int. Cl.
| | |
|---|---|
| H01M 50/44 | (2021.01) |
| H01M 50/42 | (2021.01) |
| H01M 4/62 | (2006.01) |
| H01M 10/05 | (2010.01) |
| C08F 220/48 | (2006.01) |
| H01M 50/449 | (2021.01) |
| C09D 133/20 | (2006.01) |
| C09J 133/20 | (2006.01) |
| H01M 10/0525 | (2010.01) |
| H01M 4/02 | (2006.01) |

(52) U.S. Cl.
CPC .......... C08F 220/48 (2013.01); C09D 133/20 (2013.01); C09J 133/20 (2013.01); H01M 4/622 (2013.01); H01M 10/0525 (2013.01); H01M 50/42 (2021.01); H01M 50/449 (2021.01); C09J 2203/33 (2013.01); H01M 2004/028 (2013.01)

(58) Field of Classification Search
None
See application file for complete search history.

(56) References Cited

U.S. PATENT DOCUMENTS

| | | |
|---|---|---|
| 2014/0296463 A1 | 10/2014 | Lai et al. |
| 2014/0335409 A1 | 11/2014 | Wang et al. |

FOREIGN PATENT DOCUMENTS

| | | | |
|---|---|---|---|
| CN | 1328102 A | 12/2001 | |
| CN | 1328104 A | 12/2001 | |
| CN | 101740807 A | 6/2010 | |
| CN | 102770995 A | 11/2012 | |
| CN | 103509500 A | 1/2014 | |
| CN | 103571420 A | 2/2014 | |
| CN | 104538635 * | 4/2015 | ................ C08F 2/30 |
| CN | 104538635 A | 4/2015 | |
| CN | 104798231 A | 7/2015 | |
| CN | 105018001 A | 11/2015 | |

OTHER PUBLICATIONS

Gjchemical.com/chemical-distributor/n-butyl-acrylate-50-ppm-supplier—594.aspx (Year: 2020).*
Apr. 1, 2017 International Search Report issued in International Patent Application No. PCT/CN2016/109197.

* cited by examiner

*Primary Examiner* — Maria Laios
*Assistant Examiner* — Angela J Martin
(74) *Attorney, Agent, or Firm* — Oliff PLC

(57) ABSTRACT

The invention relates to an acrylonitrile copolymer binder and application thereof in lithium ion battery, belonging to the field of lithium ion battery. The technical problem to be solved by the invention is to provide an acrylonitrile copolymer binder comprising the following structural units in percentage by weight: 78-95% of acrylonitrile unit, 1-10% of acrylic ester unit and 2-15% of acrylamide unit. For the binder of the invention, acrylonitrile monomer is taken as the main body, and acrylic ester monomer, acrylamide monomer or acrylate salt monomer with strong polarity is added to acrylonitrile for copolymerization to enable the flexibility of a polymer membrane, the affinity of an electrolyte and the proper swelling degree in the electrolyte while keeping strong adhesion or intermolecular force of acrylonitrile polymer molecules, so as to fit the periodic volume changes of electrode active materials along with lithium ion intercalation/deintercalation in charging and discharging processes, thereby improving the energy density and cycle performance of the lithium ion battery.

11 Claims, 1 Drawing Sheet

ACRYLONITRILE COPOLYMER BINDER AND APPLICATION THEREOF IN LITHIUM ION BATTERIES

TECHNICAL FIELD

The invention belongs to the field of lithium ion battery, in particular to an acrylonitrile copolymer binder and application thereof in lithium ion batteries.

BACKGROUND

Lithium ion batteries are widely used in portable electronic devices, electric automobiles, energy storage and other fields due to high energy density and long cycle life. Lithium ion batteries are mainly composed of positive electrodes, negative electrodes, diaphragms, electrolytes and casings. The working principle is to store and release electric energy through oxidation reduction reaction of reversible intercalation/deintercalation of lithium ions in electrode active materials. The preparation method of positive electrode and negative electrode of a lithium ion battery is as follows: the positive electrode active material or carbon negative electrode material is mixed with electrode binder, conductive agent and dispersion medium to form a slurry, which is coated on the corresponding current collector foil material; and a lithium ion battery is prepared through drying, rolling, cutting and other processing techniques.

In the battery charging and discharging process, the intercalation/deintercalation electrochemical reaction of lithium ions into the interior of active material particles usually causes the volume change of active material particles. As a link connecting various material particles and the current collector in the electrode, the electrode binder must maintain its ability against this change perfectly and the elasticity that will not relax in the working electrolyte environment. Otherwise, this change will likely cause peeling off of the electrode coating or increase of the interface resistance between various material particles in the coating, which has a significant impact on the capacity, rate, internal resistance, safety, cycle life and other properties of the battery. Therefore, the electrode binder must ensure good adhesion between the electrode material particles and between the material particles and the current collector, and the good adhesion should continue throughout the electrode fabrication process and the working process in the life cycle of the lithium ion battery. For the purpose of making the electrode binder resist the volume change of repeated expansion and contraction of material particles and maintaining good binder force in the presence of electrolyte, the existing practice is to strictly control the absorption of electrolyte by the electrode binder through the structural design of the binder. It is known that moderate absorption of electrolyte can plasticize the binder to make it elastic, and control the swelling degree to ensure that the electrode binder does not consume electrolyte and lose elasticity due to excessive plasticization.

Despite small amount, the electrode binder is an indispensable component in the production of lithium ion batteries. Due to the good stability of carbon negative electrode materials and copper current collectors to water, the negative electrode binder market has been mostly occupied by water-based binders with great advantages in environmental protection, process, performance, cost and other aspects. The positive electrode binder is made of a variety of excellent positive electrode active materials which are strongly alkaline in aqueous slurry; while the aluminum foil as the positive electrode current collector is an active amphoteric metal material which is neither acid-resistant nor alkali-resistant. So, the aqueous alkaline slurry, if coated on the aluminum foil, will seriously corrode the current collector and cause it to lose the proper function of the positive electrode. As a result, the positive electrode binder is mainly composed of traditional PVDF/NMP solvent binder.

PVDF binder is a fluorine-containing material, and it has the features of high price, weak adhesion, and HF release risk when decomposed at high temperature. Those skilled in the art intend to develop a new solvent-based binder system like PAN/NMP based on various modified polyacrylonitrile (PAN) as main binder resin. PAN is a strong polar polymer with good affinity with electrolyte and electrochemical stability. Using PAN instead of polyvinylidene fluoride (PVDF) can improve the polarity and bonding strength of electrode active materials and reduce the material cost. However, PAN homopolymer has a high glass-transition temperature (Tg≈85° C.), and is not flexible enough at room temperature to fully meet the technological requirements for preparing high-performance cores. In order to increase the flexibility of PAN, those skilled in the art use the copolymerization method of acrylic monomers and acrylonitrile (AN) to improve its flexibility at room temperature to meet the requirements of battery cell preparation process. However, the polarity and solubility parameters of acrylic ester monomer and carbonate solvent in the electrolyte are close, resulting in large swelling degree of PAN copolymer binder in the electrolyte and deterioration of core performance.

SUMMARY OF THE INVENTION

To solve the aforementioned problems, the invention provides an acrylonitrile copolymer solvent binder which is suitable for the preparation of modified coating of electrode plate and polyolefin diaphragm for lithium ion battery; such binder has good flexibility meeting the technological requirements for the preparation of cells, and its swelling degree in the electrolyte is maintained in a specific range to fit the periodic volume changes of electrode active materials along with lithium ion intercalation/deintercalation in charging and discharging processes, thereby improving the energy density and cycle performance of the lithium ion battery.

The technical scheme of the invention is as follows:

The first technical problem to be solved by the invention is to provide an acrylonitrile copolymer binder comprising the following structural units in percentage by weight: 78-95% of acrylonitrile unit, 1-10% of acrylic ester unit and 2-15% of acrylamide unit.

Wherein the acrylonitrile unit is introduced from acrylonitrile, the acrylate unit can be introduced from the acrylate monomer, and the acrylamide unit can be introduced from the acrylamide monomer.

Furthermore, the acrylonitrile copolymer binder of the invention can be copolymerized from the following monomers in percentage by weight: 78-95% of acrylonitrile, 1-10% of acrylic ester monomer and 2-15% of acrylamide monomer.

It also can be copolymerized from the following monomers in percentage by weight: 78-95% of acrylonitrile, 1-10% of acrylic ester monomer, 2-15% of acrylamide monomer and 2-8% of acrylate monomer. The fourth monomer "acrylate" can be added to lower the high-temperature swelling degree.

Furthermore, the acrylic ester monomer comprises a compound monomer represented by a general formula:

$CH_2=CR^1-COOR^2$, wherein $R^1=-H$ or $-CH_3$, and $R^2$ represents alkyl or cycloalkyl.

Furthermore, the acrylic ester monomer is selected from the flowing compounds: at least one of methyl acrylate, ethyl acrylate, propyl acrylate, isopropyl acrylate, n-butyl acrylate, isobutyl acrylate, tert-butyl acrylate, n-amyl acrylate, isoamyl acrylate, n-hexyl acrylate, 2-ethylhexyl acrylate, isooctyl acrylate, methyl methacrylate, ethyl methacrylate, n-propyl methacrylate, isopropyl methacrylate, n-butyl methacrylate, isobutyl methacrylate, tert-butyl methacrylate, n-amyl methacrylate, iso-pentyl methacrylate, n-hexyl methacrylate, 2-ethylhexyl methacrylate and iso-octyl methacrylate.

The acrylamide monomer comprises a compound monomer represented by a general formula: $CH_2=CR^3CONHR^4$, wherein $R^3=-H$ or $-CH_3$, and $R^4$ represents one of $-H$, alkyl, cycloalkyl or aryl.

Furthermore, the acrylamide monomer is preferably selected from the following compounds: at least one of acrylamide, N-methacrylamide, N-ethyl acrylamide, N-butyl acrylamide and 2-methacrylamide.

The acrylate monomer comprises a compound monomer represented by a general formula: $CH_2=CR^5-COOM$, wherein $R^5=-H$ or $-CH_3$, and $M=Li^+$, $Na^+$ or $K^+$.

Furthermore, the acrylate monomer is preferably selected from the following compounds: at least one of lithium acrylate, sodium acrylate, lithium methacrylate and sodium methacrylate. Generally, it is also feasible to directly add equivalent acrylic monomers and corresponding hydroxides, carbonates or bicarbonates for neutralization.

The acrylonitrile copolymer binder of the invention has good flexibility at room temperature, and has proper swelling degree at normal temperature (25° C.) and high temperature (60° C.). Its swelling degree in electrolyte is kept within the range of 10-20% at 25° C. and within the range of 40-68% at 60° C.

The second technical problem to be solved by the invention is to provide a preparation method of the acrylonitrile copolymer binder, comprising the step of carrying out polymerization on all monomers under the action of initiator.

The initiator is a water-soluble initiator or an oil-soluble initiator. The water-soluble initiator comprises ammonium persulfate, potassium persulfate, hydrogen peroxide, 2,2'-azobis(isobutyramidine) or a redox initiator system composed of the water-soluble initiator, $NaHSO_3$ and $FeSO_4$. The oil-soluble initiator comprises organic peroxide and azo-compound, and the dosage of the initiator accounts for 0.2-2.0% of the total weight of monomer.

Furthermore, adjuvant also can be added for the method.

The adjuvant is chain transfer agent, emulsifier or dispersant, and the dosage of the adjuvant accounts for 0.1-10% of the total weight of monomer;

Furthermore, the terpolymer binder is prepared by the following steps: firstly, adding dispersion medium (water, organic solvent or mixed solvent) to a reactor, introducing inert gas, adding acrylonitrile, acrylic ester monomer and acrylamide monomer while stirring, increasing temperature to 40-80° C. in inert atmosphere, and then adding initiator for polymerization reaction 2-24 h at a constant temperature to obtain polymer dispersion, finally, obtaining the acrylonitrile copolymer binder by means of precipitation, filtration, washing, drying, crushing and sieving in sequence.

The quadripolymer binder is prepared by the following steps: firstly, adding acrylate monomer to the dispersion medium, adding acrylonitrile, acrylic ester monomer, acrylamide monomer and required adjuvant (or no adjuvant is added) while stirring and dissolving, increasing temperature to 40-80° C. in inert atmosphere, and then adding initiator for polymerization reaction 2-24 h at a constant temperature to obtain polymer dispersion, finally, obtaining the acrylonitrile copolymer binder by means of precipitation, filtration, washing, drying, crushing and sieving in sequence.

The adjuvant comprises chain transfer agents, emulsifiers and dispersants that may be used as required. The following agents can be listed: transfer agents such as ethanol, methanol, ethanethiol and lauryl mercaptan, emulsifiers such as sodium dodecyl benzene sulfonate, sodium dodecylbenzene ether sulfonate, sodium lauryl sulfate, sodium dodecyl sulfate, sodium laurate, sodium lauryl ether sulfate and polyoxyethylene sorbitan laurate, and water-soluble polymer dispersants such as gelatin, polyvinylpyrrolidone, sodium polyacrylate, polyvinyl alcohol and sodium carboxymethyl cellulose.

The third technical problem to be solved by the invention is the applications of the acrylonitrile copolymer binder in a positive electrode plate or a coated diaphragm for lithium ion battery.

The fourth technical problem to be solved by the invention is to provide a positive electrode plate for lithium ion battery, comprising a positive material and a binder. The binder is the acrylonitrile copolymer binder, and the application amount of the binder accounts for 0.5-5 wt % of the total solid content, preferably 1-3 wt %.

The fifth technical problem to be solved by the invention is to provide a coated diaphragm for lithium ion battery, comprising a base membrane, a filler and a binder. The binder is the acrylonitrile copolymer binder, and the application amount of the binder accounts for 1-40 wt % of the total solid content, preferably 5-20 wt %.

The beneficial effects of the invention are as follows:

For the binder of the invention, acrylonitrile monomer is taken as the main body, and acrylic ester monomer, acrylamides with strong polarity or its derivatives monomer, or acrylate monomer is added to acrylonitrile for copolymerization to enable the flexibility of a polymer membrane, the affinity of an electrolyte and the proper swelling degree in the electrolyte while keeping strong adhesion or intermolecular force of acrylonitrile polymer molecules, so as to improve the energy density and cycle performance of the lithium ion battery. The coated diaphragm prepared by using the acrylonitrile copolymer binder of the invention has excellent battery performance.

DETAILED DESCRIPTION OF THE EMBODIMENTS

Figure 1:
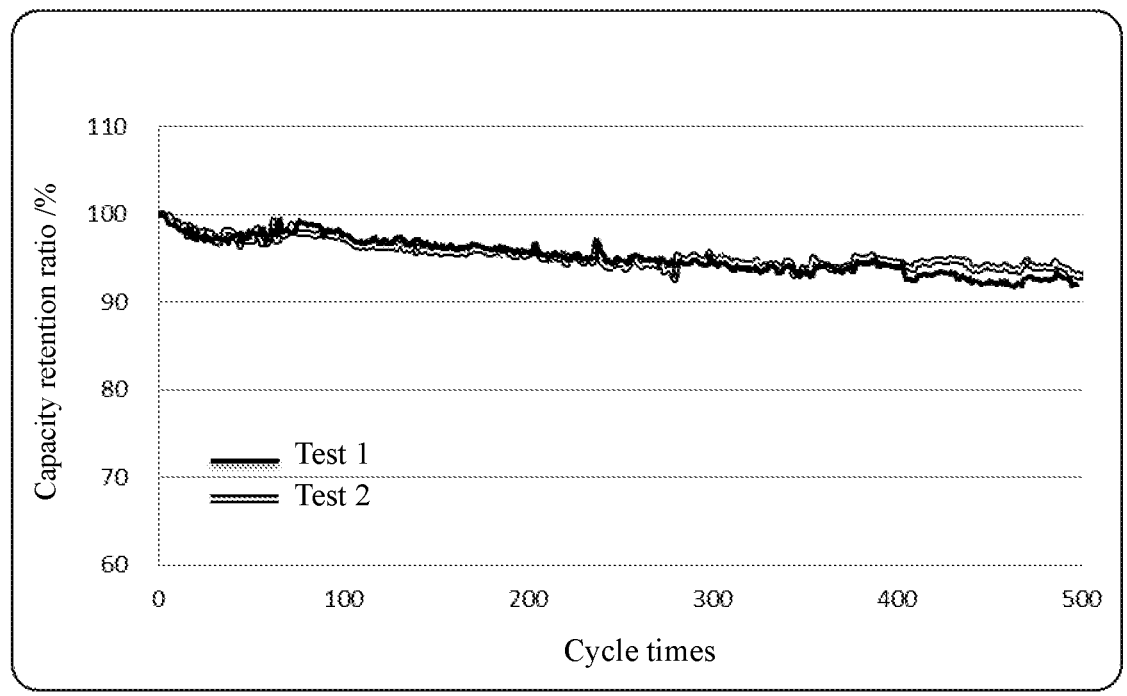
FIG. 1 shows the cycle capacity retention ratio of a battery prepared by different binders in Example 9 of the invention.

The first technical problem to be solved by the invention is to provide an acrylonitrile copolymer binder with acrylonitrile as its main polymeric monomer. For such binder, acrylonitrile monomer is introduced to acrylic ester monomer to reduce glass transition temperature of the acrylonitrile polymer and improve polymer flexibility, and acrylamide or its derivative monomer is also introduced to control the binder within the 10-68% of swelling degree in electrolyte. Preferably, the acrylonitrile copolymer binder of the invention is an acrylonitrile copolymer having the swelling degree in the electrolyte within the range.

The swelling degree of the acrylonitrile copolymer binder in the electrolyte is within the range of 10-68%. When the swelling degree of the binder in the electrolyte is more than 68%, the spacing between the active material particles in the electrode plate is too large, which increases the electronic transition resistance between the particles, increases the internal resistance of the battery and decreases the capacity; at the same time, the electrode plate expands, the thickness of the cell increases, and the electrode active material is likely separated from the current collector during the charging-discharging cycle, thus the cycle performance becomes poor. When the swelling degree of the binder in the electrolyte is less than 10%, the periodic changes of the volume of the electrode active material cannot be effectively buffered in the charging and discharging process, and the electrode active material coating is cracked to increase the internal resistance of the battery and reduce the cycle life of the battery. When the swelling degree of the binder in the electrolyte is within 10-68%, the changes of the volume of the electrode active material can be effectively buffered in the charging and discharging process to reduce the cracking condition of the electrode active material coating, inhibit the excessive swelling of the electrode, and improve the battery capacity and cycle life.

The swelling degree of the binder refers to the swelling degree obtained when the binder is immersed in an electrolyte solvent, which is specifically obtained by the following test method, including steps: Firstly, pouring NMP solution of binder into a specific vessel, roasting it to volatilize NMP solvent so as to obtain a binder polymer membrane, controlling the thickness of the membrane to be 100 μm and cutting it into a film with size of L 50 mm×W 50 mm. Vacuumizing and drying the film for 24 h and weighing it, taking the completely dried film out after immersing it in the electrolyte at normal temperature (25° C.) for 72 h or at 60° C. for 24 respectively, removing the electrolyte solvent adhered on the film surface and weighing the electrolyte solvent absorbed by the film. The weight increase (%) of the film before and after immersion in the electrolyte solvent at normal temperature (25° C.) or at high temperature (60° C.) is the swelling degree of the binder at normal temperature (25° C.) or at high temperature (60° C.).

Specifically, in the invention, the acrylonitrile copolymer binder is designed to comprise the following structural units in percentage by weight: 78-95% of acrylonitrile unit, 1-10% of acrylic ester unit and 2-15% of acrylamide unit.

The acrylonitrile unit is introduced from acrylonitrile, the acrylate unit can be introduced from the acrylate monomer, and the acrylamide unit can be introduced from the acrylamide monomer. Additionally, other units can be included, e.g., acrylate unit.

As an embodiment of the invention, the acrylonitrile copolymer binder can be copolymerized from the following monomers in percentage by weight: 78-95% of acrylonitrile, 1-10% of acrylic ester monomer and 2-15% of acrylamide monomer.

As another embodiment of the invention, the acrylonitrile copolymer binder can be copolymerized from the following monomers in percentage by weight: 78-95% of acrylonitrile, 1-10% of acrylic ester monomer, 2-15% of acrylamide monomer and 2-8% of acrylate monomer. The acrylate monomer can be added to lower the high-temperature swelling degree.

Furthermore, the acrylic ester monomer comprises a compound monomer represented by a general formula: $CH_2=CR^1-COOR^2$, wherein $R^1=-H$ or $-CH_3$, and $R^2$ represents alkyl or cycloalkyl.

Furthermore, the acrylic ester monomer is preferably selected from the following compounds: at least one of methyl acrylate, ethyl acrylate, propyl acrylate, isopropyl acrylate, n-butyl acrylate, isobutyl acrylate, tert-butyl acrylate, n-amyl acrylate, isoamyl acrylate, n-hexyl acrylate, 2-ethylhexyl acrylate, isooctyl acrylate, methyl methacrylate, ethyl methacrylate, n-propyl methacrylate, isopropyl methacrylate, n-butyl methacrylate, isobutyl methacrylate, tert-butyl methacrylate, n-amyl methacrylate, iso-pentyl methacrylate, n-hexyl methacrylate, 2-ethylhexyl methacrylate and iso-octyl methacrylate.

The acrylamide monomer comprises a compound monomer represented by a general formula: $CH_2=CR^3CONHR^4$, wherein $R^3=-H$ or $-CH_3$, and $R^4$ represents one of $-H$, alkyl, cycloalkyl or aryl.

Furthermore, the acrylamide monomer is preferably selected from the following compounds: at least one of acrylamide, N-methacrylamide, N-ethyl acrylamide, N-butyl acrylamide and 2-methacrylamide.

The acrylate monomer comprises a compound monomer represented by a general formula: $CH_2=CR^5-COOM$, wherein $R^5=-H$ or $-CH_3$, and $M=Li^+$, $Na^+$ or $K^+$.

Furthermore, the acrylate monomer is preferably selected from the following compounds: at least one of lithium acrylate, sodium acrylate, lithium methacrylate and sodium methacrylate. Generally, it is also feasible to directly add equivalent acrylic monomers and corresponding hydroxides, carbonates or bicarbonates for neutralization.

In the invention, the method for preparing the binder by polymerizing the selected monomer compositions is not particularly limited, and any one of solution polymerization, suspension polymerization, bulk polymerization and emulsion polymerization can be used. The polymerization reaction is preferably carried out in an aqueous medium, and the adjuvant such as chain transfer agents, emulsifiers and dispersants can be added to the system according to the requirements of the polymerization reaction.

Furthermore, the acrylonitrile copolymer binder is prepared by the following steps: adding the preferred monomer composition and adjuvant as required to a dispersion medium, then adding an initiator capable of initiating polymerization reaction to the system, and initiating the composition at a certain temperature condition for polymerization.

The adjuvant for the polymerization reaction mainly refers to chain transfer agents, emulsifiers and dispersants, including alcohol chain transfer agents commonly used for emulsion polymerization, ionic and non-ionic emulsifiers and polymer dispersants. The following agents can be listed: transfer agents such as ethanol, methanol, ethanethiol and lauryl mercaptan, emulsifiers such as sodium dodecyl benzene sulfonate, sodium dodecylbenzene ether sulfonate, sodium lauryl sulfate, sodium dodecyl sulfate, sodium laurate, sodium lauryl ether sulfate and polyoxyethylene sorbitan laurate, and water-soluble polymer dispersants such as gelatin, polyvinylpyrrolidone, sodium polyacrylate, polyvinyl alcohol and sodium carboxymethyl cellulose. All adjuvants can be used alone or in combination of two or more. The addition of the adjuvant is 0.1-10% relative to the total weight of the monomer composition.

The initiator can be a water-soluble initiator or an oil-soluble initiator. The water-soluble initiator comprises ammonium persulfate, potassium persulfate, hydrogen peroxide, 2,2'-azobis(isobutyramidine) or a redox initiator system composed of the water-soluble initiator, $NaHSO_3$ and FeSO$_4$. The oil-soluble initiator comprises organic peroxide and azo-compound. The dosage of the initiator accounts for 0.2-2.0% of the total weight of monomer.

Furthermore, the preparation method of the acrylonitrile copolymer binder is as follows:

The terpolymer is prepared by the following steps: firstly, introducing inert gas into the dispense medium to drive oxygen, adding acrylonitrile, acrylic ester monomer (the second monomer), acrylamide monomer, acrylamide monomer (the third monomer) and adjuvant which may be used as required while stirring, increasing temperature to 40-80° C. in inert atmosphere, and then adding initiator for polymerization reaction 2-24 h at a constant temperature to obtain polymer dispersion, finally, obtaining the acrylonitrile copolymer binder by means of precipitation, filtration, washing, drying, crushing and sieving in sequence.

The quadripolymer binder is prepared by the following steps: firstly, adding acrylate monomer to the dispersion medium, adding acrylonitrile, acrylic ester monomer (the second monomer), acrylamide monomer, acrylamide monomer (the third monomer) and adjuvant which may be used as required while stirring and dissolving, increasing temperature to 40-80° C. in inert atmosphere, and then adding initiator for polymerization reaction 2-24 h at a constant temperature to obtain polymer dispersion, finally, obtaining the acrylonitrile copolymer binder by means of precipitation, filtration, washing, drying, crushing and sieving in sequence.

Applications of the acrylonitrile copolymer binder in a positive electrode plate or a coated diaphragm for lithium ion battery.

For a positive electrode plate for lithium ion battery, the acrylonitrile copolymer binder is used, and the application amount of the binder accounts for 0.5-5 wt % of the total solid content, preferably 1-3 wt %.

As an embodiment, the positive material is at least one of LiFePO$_4$, LiCoO$_2$, LiNiO$_2$, Li(Ni$_x$Co$_y$Mn$_z$)O$_2$ or LiMn$_2$O$_4$.

For a coated diaphragm for lithium ion battery, the acrylonitrile copolymer binder is used, and the application amount of the binder accounts for 1-40 wt % of the total solid content, preferably 5-20 wt %.

As an embodiment, the base membrane of the diaphragm is a polyolefin microporous membrane, a polymer woven diaphragm or a polymer non-woven diaphragm, and the filler is at least one of nanometer inorganic ceramic particles or polymer powder materials.

For the acrylonitrile copolymer binder of the invention, a coated diaphragm and a lithium ion battery electrode plate are prepared according to the coated diaphragm preparation route and the lithium ion battery production process commonly used in this industry, and assembled into an aluminum-plastic film battery with flexible packaging for battery performance testing investigation.

Example 1 Preparation of New Binder of the Invention 900 parts of distilled water were added to a reaction vessel and stirred, high-purity nitrogen was introduced for deoxygenation 1 h, 4 parts of methyl acrylate, 12 parts of acrylamide and 84 parts of acrylonitrile were added, the mixture was heated in inert atmosphere to 60° C. and maintained at a constant temperature, and then 5 parts of 20% ammonium persulfate initiator solution were added to initiate the reaction until the reaction was ended after 4 hours. Finally, a binder was obtained by means of filtration, drying, crushing and sieving in sequence.

Example 2 Preparation of New Binder of the Invention

Such preparation method was basically the same as that in example 1 except that the dosage of acrylamide was reduced to 5 parts, that is, the dosages of methyl acrylate, acrylamide and acrylonitrile were adjusted to 4 parts, 5 parts and 91 parts respectively.

Example 3 Preparation of New Binder of the Invention 900 parts of distilled water were added to a reaction vessel and stirred, 4 parts of lithium methacrylate were added, pH was adjusted to 7-9, high-purity nitrogen was introduced for deoxygenation 1 h, and then 4 parts of methyl acrylate, 8 parts of acrylamide and 84 parts of acrylonitrile were added, and the mixture was heated to 60° C. and maintained at a constant temperature, and then 5 parts of 20% ammonium persulfate initiator solution were added to initiate the reaction until the reaction was ended after 4 hours. Finally, a binder was obtained by means of filtration, drying, crushing and sieving in sequence.

Example 4 Preparation of New Binder of the Invention

Such preparation method was basically the same as that in Example 3 except that the dosages of acrylamide and methacrylic acid were adjusted to 6 parts and 6 parts respectively.

Example 5 Preparation of New Binder of the Invention

Such preparation method was basically the same as that in Example 1 except that methyl acrylate was replaced with butyl acrylate in equal parts by weight.

Example 6 Preparation of New Binder of the Invention

Such preparation method was basically the same as that in example 4 except that methyl acrylate was replaced with butyl acrylate in equal parts by weight.

Example 7 Preparation of New Binder of the Invention 890 parts of distilled water were added to a reaction vessel and stirred, high-purity nitrogen was introduced for deoxygenation 1 h, 4 parts of methyl acrylate, 5 parts of acrylamide, 91 parts of acrylonitrile and 10 parts of absolute ethyl alcohol were added, the mixture was heated to 60° C. in inert atmosphere and maintained at a constant temperature, and then 5 parts of 20% ammonium persulfate initiator solution were added to initiate the reaction until the reaction was ended after 4 hours. Finally, a binder was obtained by means of filtration, drying, crushing and sieving in sequence.

Comparison example 1

Preparation of Binder 400 parts of distilled water were added to a reaction vessel and stirred, high-purity nitrogen was introduced for deoxygenation 1 h, polyvinyl alcohol PVA was added for dissolution, then 10 parts of methyl acrylate and 80 parts of acrylonitrile were added, heated to 50° C. and maintained at a constant temperature, and 0.7 parts of azodiisobutyronitrile initiator were dissolved into 10 parts of acrylonitrile, prepared into a solution and added to a reaction vessel for reaction until the reaction was ended after 6 hours. Finally, a binder was obtained by means of filtration, drying, crushing and sieving in sequence.

Comparison Example 2 Preparation of Binder

Such preparation method was basically the same as that in comparison example 1 except that methyl acrylate was replaced with butyl acrylate in equal parts by weight.

Comparison Example 3 Preparation of Binder 900 parts of distilled water were added to a reaction vessel and stirred, high-purity nitrogen was introduced for deoxygenation 1 h, then 5 parts of methyl acrylate and 95 parts of acrylonitrile were added, the mixture was heated to 60° C. in inert atmosphere and maintained at a constant temperature, and then 5 parts of 20% ammonium persulfate initiator solution were added to initiate the reaction until the reaction was ended after 4 hours. Finally, a binder was obtained by means of filtration, drying, crushing and sieving in sequence.

Comparison Example 4 Preparation of Binder

Such preparation method was basically the same as that in comparison example 2 except that the dosages of butyl acrylate and acrylonitrile were adjusted to 5 parts and 85 parts respectively.

Comparison Example 5 Preparation of Binder

Such preparation method was basically the same as that in comparison example 1 except that the dosages of methyl acrylate and acrylonitrile were adjusted to 20 parts and 70 parts respectively.

Test Example 1 Performance Test of Binder 1.1 Determination of Binder Flexibility The samples from each example and comparison example were determined for flexibility by reference to *Determination of Flexibility of Films* (GB/T 1731-93). The sample powder was prepared into 5% NMP solution and roasted on a polytetrafluoroethylene plate to produce a casting film with a thickness of 100±20 im. The flexibility of the sample was measured by using QTX film elasticity tester. The adhesive film was tightly pressed on the shaft rod 1 to the shaft rod 7 sequentially, and was bent 180 around the shaft rod, 900 on the left and 90° on the right, and bent for 2-3 s. If the adhesive film was free from any reticulate, crack and fracture phenomena observed under a quadruple magnifier, the passable minimum diameter is the flexibility index of the adhesive film. Specifically, the radius or curvature radius of the shaft rod 1 to the shaft rod 7 was R1=7.5 mm, R2=5 mm, R3=2.5 mm, R4=2 mm, R5=1.5 mm, R6=1 mm, R7=0.5 mm. Each group of samples was measured for three times and the measured values were averaged. The test results are given in Table 1. It can be seen from Table 1 that the radius of the shaft rod of the binder produced by the invention is 1-1.5 mm, indicating that the binder produced by the invention has good flexibility and can be used in lithium ion batteries.

1.2 Swelling Property Test of Binder

The binders from each example and comparison example were stirred at 400 rpm and dissolved in NMP at 60° C. to prepare a 5% solution. After complete dissolution, the solution was filtered through a 100-mesh screen and roasted on a polytetrafluoroethylene plate to prepare a casting film with a thickness of 100±20 m.

The binder dry film was placed in electrolyte solvent (ethylene carbonate EC:diethyl carbonate DEC:dimethyl carbonate DMC=2:1:1) to test the swelling degree of the dry film in electrolyte solvent at different temperature. The swelling degree was expressed by the ratio of the increased mass of the adhesive film after soaking to its mass before soaking. The dry film was insulated at 25° C. for 72 h to test its low-temperature swelling and insulated at 60° C. for 24 h to test its high temperature swelling. Five parallel experiments were set up for each binder and the results were averaged. The dry film swelling test data of the binder prepared in the above comparison examples and examples are shown in Table 1. It can be seen from Table 1 that the low-temperature swelling degree and the high-temperature swelling degree of the binder prepared by the invention are 7.5-18.1% and 41.1-67.8% respectively; these data are 41.7-208% and 76.4-256% respectively in the comparison example. It can be found that, for the purpose of copolymerization, directly adding acrylic ester monomers such as MA or BA will cause excessive swelling or even dissolution of the adhesive film in the electrolyte solvent. In this case, it is difficult for the binder to ensure its proper adhesive ability. In addition, if AM and acrylic ester monomers with high polarity are added for copolymerization while MA or BA is added, the swelling degree of the adhesive film in the electrolyte solvent is effectively controlled, so as to weaken the erosion of the binder by the electrolyte solvent, and maintain the adhesive ability and the adhesive effect.

TABLE 1

Swelling degree of acrylonitrile copolymer binders obtained in examples and comparison examples

| | Comonomer percentage by weight | | | | | Determination of flexibility | Swelling degree/% | |
| --- | --- | --- | --- | --- | --- | --- | --- | --- |
| No. | AN | MA | BA | AM | MAA-Li | | 72 h at 25° C. | 24 h at 60° C. |
| Example 1 | 84 | 4 | | 12 | | 1.5 mm | 14.9 | 59.8 |
| Example 2 | 91 | 4 | | 5 | | 1.5 mm | 11.2 | 64.6 |
| Example 3 | 84 | 4 | | 8 | 4 | 1.5 mm | 18.1 | 44.1 |
| Example 4 | 84 | 4 | | 6 | 6 | 1.5 mm | 10.6 | 41.1 |
| Example 5 | 84 | | 4 | 12 | | 1.0 mm | 17.5 | 67.8 |
| Example 6 | 84 | | 4 | 6 | 6 | 1.0 mm | 10.5 | 54.3 |
| Example 7 | 91 | 4 | | 5 | | 1.5 mm | 12.6 | 62.1 |

TABLE 1-continued

Swelling degree of acrylonitrile copolymer binders obtained in examples and comparison examples

| | Comonomer percentage by weight | | | | | Determination of flexibility | Swelling degree/% | |
|---|---|---|---|---|---|---|---|---|
| | | | | | | | 72 h at 25° C. | 24 h at 60° C. |
| No. | AN | MA | BA | AM | MAA-Li | | | |
| Comparison example 1 | 90 | 10 | | | | 1.0 mm | 163 | 219 |
| Comparison example 2 | 90 | | 10 | | | 0.5 mm | 208 | 256 |
| Comparison example 3 | 95 | 5 | | | | 1.5 mm | 41.7. | 115 |
| Comparison example 4 | 95 | | 5 | | | 1.0 mm | 57.6 | 146 |
| Comparison example 5 | 80 | 20 | | | | 0.5 mm | Dissolved | Dissolved |

Example 8 Peel Strength of Electrode Plates Prepared by Using the Binder of the Invention Firstly, the binder prepared in example 6 was dissolved in NMP, then conductive carbon and lithium cobaltate were added and stirred at high speed for 12 h to obtain mixed slurry. The mixed slurry was coated on aluminum foil by a battery coater and dried at 110° C. The dried electrode plate was rolled from 170 μm originally to 107 μm.

PVDF binder for production was used in test 1, and the binder of example 6 was used in test 2. Both the positive electrode materials used for the two electrode plates and the preparation process were the same. Five groups of parallel experiments were designed in test 1 and test 2, and the peel strength of the obtained electrode plates was averaged. The ratio of slurry and the peel strength (90°) of the obtained electrode plate are shown in Table 2. It can be seen from the table that, compared with the binder amount of PVDF, 60% of the binder obtained by the invention is required to achieve the same peel strength of electrode plate. The decreased percentage of binder and active substance lithium cobaltate have positive effects on improving the battery capacity and reducing the influence of binder on the electrical performance of lithium ion batteries.

TABLE 2

Peel strength of electrode plates

| Test No. | Positive electrode binder | Binder ratio | Lithium cobalt oxide ratio | Conductive carbon ratio | Peel strength of electrode plates |
|---|---|---|---|---|---|
| Test 1 | PVDF | 2.0% | 96.0% | 2.0% | 162 N/m |
| Test 2 | Example 6 | 1.2% | 96.8% | 2.0% | 170 N/m |

Example 9 Performance of Lithium Ion Battery Prepared by Using the Binder of the Invention The battery was assembled by taking the lithium cobaltate/PVDF electrode and lithium cobaltate/PAN electrode prepared in example 8 as positive electrodes, and the same carbon electrode prepared from the same aqueous binder as negative electrode, and was tested for performance comparison. The manufacturing process was as follows:

The positive electrode plate, the negative electrode plate and the diaphragm were wound and reshaped to prepare a bare cell, which was loaded into an aluminum-plastic shell. Through vacuum roasting, electrolyte filling and vacuum sealing, a square cell was prepared, and then performance tests such as formation, charging and discharging, cycle life and the like were carried out on the cell through a battery tester. In this example, 30 batteries were prepared in test 1 and test 2 respectively; in which PVDF binder was used in test 1 and the binder of example 6 was used in test 2. The positive electrode plate made of different binder uses the same negative electrode plate, diaphragm, electrolyte and dosage when assembling the battery.

The basic parameters of the battery are shown in Table 3, and all data of each group in Table 3 are the average value of 10 batteries.

The rate capability of the batteries is shown in Table 4, and all data of each group in Table 4 are the average value of 10 batteries.

In addition, the storage performance of the battery at 70° C. for 96 h was tested, and the results are shown in Table 5. All data of each group in Table 5 are the average of 10 batteries.

It can be seen that the battery of test 2 is slightly better than the battery of test 1 in terms of capacity, internal resistance, thickness and rate capacity, and is obviously better than the battery of test 1 in terms of high temperature storage performance.

In the battery cycle performance test, one battery was selected for 1.0 C room temperature cycle performance in each test. See FIG. 1 for the attenuation of cycle capacity retention ratio with cycle times in each test. The comparison of cycle thickness swelling ratio of the two batteries is shown in FIG. 2.

Figure 2:
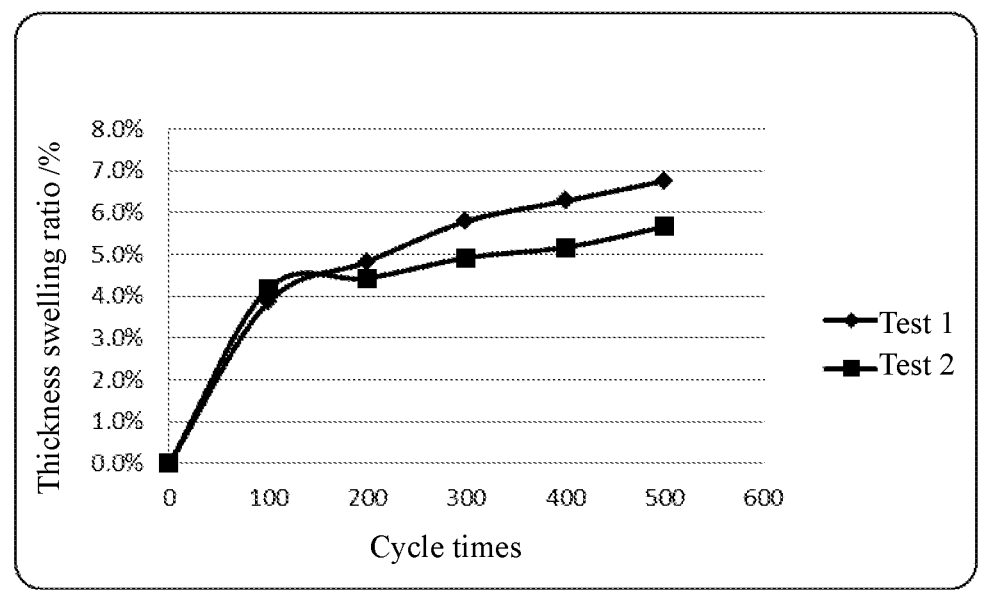
FIG. 2 shows the cycle thickness swelling ratio of a battery prepared by different binders in Example 9 of the invention.

It can be seen from FIG. 1 that, in the 1.0 C normal temperature cycle performance test, the capacity retention ratio of the battery in test 1 starts to be significantly lower than that of the battery in test 2 when the cycle number reaches 400 times or more. It can be seen from FIG. 2 that the thickness swelling rate of the battery of test 1 starts to be significantly higher than that of the battery of test 2 when the number of cycles reaches 200 or more. The capacity retention ratio and thickness swelling rate will respectively reflect the battery life and safety performance.

TABLE 3

Basic battery parameters

| Test No. | Battery model | Capacity/ mAh | Internal resistance/mΩ | Thickness/ mm |
|---|---|---|---|---|
| Test 1 | 446379 | 3121 | 27.6 | 4.19 |
| Test 2 | 446379 | 3136 | 26.8 | 4.18 |

TABLE 4

| | Magnification performance of battery | | | | | | | | |
|---|---|---|---|---|---|---|---|---|---|
| | Discharge at 0.2 C. | | Discharge at 0.5 C. | | Discharge at 1 C. | | Discharge at 1.5 C. | | Discharge at 2.0 C. |
| Test No. | Capacity mAh | Percentage/ % | Capacity mAh | Percentage/ % | Capacity mAh | Percentage/ % | Capacity mAh | Percentage/ % | Capacity mAh | Percentage/ % |
| Test 1 | 3125.18 | 100.0 | 3039.15 | 97.3 | 2963.76 | 94.8 | 2847.54 | 91.1 | 2670.23 | 85.4 |
| Test 2 | 3139.97 | 100.0 | 3072.28 | 97.8 | 3002.85 | 95.6 | 2899.83 | 92.4 | 2750.80 | 87.6 |

TABLE 5

| | Performance of battery stored at 70° C. for 96 h | | | | | | |
|---|---|---|---|---|---|---|---|
| | | | After storage | | | | |
| | | | Internal | Charge and discharge at 0.5 .C | | | |
| Test No. | Initial capacity/ mAh | Thickness swelling rate/% | resistance increase ratio/% | Surplus capacity/ mAh | Surplus capacity rate/% | Discharge capacity/ mAh | Capacity recovery rate/% |
| Test 1 | 3123.3 | 5.9 | 26.2 | 2308.6 | 73.9 | 2495.3 | 79.9 |
| Test 2 | 3135.1 | 3.2 | 25.9 | 2451.1 | 78.2 | 2681.6 | 85.5 |

The invention claimed is:

1. An acrylonitrile copolymer binder, comprising the following structural units in percentage by weight: 78-95% of acrylonitrile unit, 1-10% of acrylic ester unit, 2-15% of acrylamide unit, and 2-8% of acrylate salt unit,
    wherein the acrylic ester unit is polymerized from an acrylic ester monomer that is $CH_2=CR^1-COOR^2$, where $R^1$ is —H or —$CH_3$, and $R^2$ is alkyl or cycloalkyl,
    the acrylamide unit is polymerized from an acrylamide monomer that is $CH_2=CR^3CONHR^4$, where $R^3$ is —H or —$CH_3$, ad $R^4$ is —H, alkyl, cycloalkyl or aryl, and
    the acrylate salt unit is polymerized from an acrylate salt monomer that is $CH_2=CR^5-COOM$, where $R^5$ is —H or —$CH_3$, and M is $Li^+$, $Na^+$ or $K^+$.

2. The acrylonitrile copolymer binder according to claim 1, being copolymerized from the following monomers in percentage by weight: 78-95% of acrylonitrile, 1-10% of the acrylic ester monomer, 2-15% of the acrylamide monomer, and 2-8% of the acrylate salt monomer.

3. The acrylonitrile copolymer binder according to claim 1, wherein:
    the acrylic ester monomer is at least one of methyl acrylate, ethyl acrylate, propyl acrylate, isopropyl acrylate, n-butyl acrylate, isobutyl acrylate, tert-butyl acrylate, n-amyl acrylate, isoamyl acrylate, n-hexyl acrylate, 2-ethylhexyl acrylate, isooctyl acrylate, methyl methacrylate, ethyl methacrylate, n-propyl methacrylate, isopropyl methacrylate, n-butyl methacrylate, isobutyl methacrylate, tert-butyl methacrylate, n-amyl methacrylate, iso-pentyl methacrylate, n-hexyl methacrylate, 2-ethylhexyl methacrylate and iso-octyl methacrylate;
    the acrylamide monomer is at least one of acrylamide, N-methacrylamide, N-ethyl acrylamide, N-butyl acrylamide and 2-methacrylamide.

4. The acrylonitrile copolymer binder according to claim 1, wherein the acrylate salt monomer is at least one of lithium acrylate, sodium acrylate, lithium methacrylate and sodium methacrylate.

5. A method comprising applying the acrylonitrile copolymer binder according to claim 1 in a positive electrode plate or a coated diaphragm to a lithium ion battery.

6. A positive electrode plate for lithium ion battery, comprising a positive material and a binder, wherein the binder is the acrylonitrile copolymer binder of claim 1.

7. The positive electrode plate for lithium ion battery according to claim 6, wherein the application amount of the binder accounts for 0.5-5 wt % of the total solid content.

8. The positive electrode plate for lithium ion battery according to claim 7, wherein the application amount of the binder accounts for 1-3 wt % of the total solid content.

9. A coated diaphragm for lithium ion battery, comprising a base membrane, a filler and a binder, wherein the binder is the acrylonitrile copolymer binder of claim 1.

10. The coated diaphragm for lithium ion battery according to claim 9, wherein the application amount of the binder accounts for 1-40 wt % of the total solid content.

11. The coated diaphragm for lithium ion battery according to claim 10, wherein the application amount of the binder accounts for 5-20 wt % of the total solid content.

* * * * *